United States Patent [19]

Myer

[11] Patent Number: 5,279,069

[45] Date of Patent: Jan. 18, 1994

[54] ADJUSTABLE TREE COLLAR AND METHOD

[76] Inventor: C. Randolph Myer, P.O. Box 621, Manchester, Mass. 01944

[21] Appl. No.: 913,464

[22] Filed: Jul. 14, 1992

[51] Int. Cl.⁵ ............................................. A01G 17/00
[52] U.S. Cl. ................................................. 47/25
[58] Field of Search ....................... 47/25, 9; 52/102

[56] References Cited

U.S. PATENT DOCUMENTS

| | | | |
|---|---|---|---|
| 915,897 | 3/1909 | Skorness | 47/25 |
| 2,102,748 | 12/1937 | Racquin | 47/25 |
| 2,263,874 | 11/1941 | Hilleman | 47/25 |

Primary Examiner—Henry E. Raduazo
Attorney, Agent, or Firm—Richard P. Crowley

[57] ABSTRACT

A tree- or post-collar apparatus and method to form a protective area about the base of a tree or post, and which collar apparatus comprises a plurality of edge-overlapping, generally trapezoidal, flat panels having an inner and outer arcuate edge, to form an adjustable, inner, open circle about the tree or post, and fasteners extending through slotted openings, to permit the adjustment of the collar apparatus to the defined, open, inner diameter, and to secure the flat panels in the adjusted position.

12 Claims, 2 Drawing Sheets

ADJUSTABLE TREE COLLAR AND METHOD

BACKGROUND OF THE INVENTION

It is often desirable to eliminate or reduce the growth of grass or weeds about the base of a post, such as a generally upright post, or about the base of a tree or shrub. The elimination of such grass or weeds about the base eliminates the need for trimming the grass or weeds about the base and avoids damage to the base of the post from lawn mowers, weed-cutting apparatuses and the like. The growth of grass or weeds about the base of the post or tree can be controlled by eliminating the sunlight through the employment of a covered area about the base of the post or tree.

Therefore, it is desirable to provide for a tree-or post-collar apparatus and method which is inexpensive, easily assembled and used and is reusable and which may be adjusted to encircle the post or irregular tree-stem trunk, to eliminate the growth of grass or weeds about the base covered by the post collar, and which can expand to accommodate tree-trunk growth.

SUMMARY OF THE INVENTION

The invention relates to a post-collar apparatus and a method to eliminate the growth of grass, weeds or other growing material about the base of a post. In particular, the invention is directed to an adjustable tree-collar apparatus and method adapted to encircle a post, tree or shrub, to eliminate the growth of grass or weeds and to eliminate the need for trimming about the protected, encircled base.

The invention is directed to an adjustable, inexpensive, practical, simply assembled and used post-, tree- or shrub-collar apparatus to be placed on the ground and to encircle the base of the post. The adjustable post collar of the invention comprises a plurality of at least three, and generally from three to seven or more, depending on the diameter of the trunk to be encircled, separate, generally trapezoidal, flat-sheet, opaque panels or leaf elements, such as, for example, but not limited to, molded, imperforated, plastic, flat-sheet elements. The flat-sheet elements employed generally have a one and other longitudinal ends and a generally arcuate inner edge and a generally arcuate outer edge, to form an outer circular diameter and an inner circle. The edges are generally concentric and are of defined width; for example, from about 3 to 6 or more inches. Each of the flat-sheet elements have at least one, elongated, slotted opening therein, particularly at one end, and more particularly generally comprise two slotted openings, one adjacent the inner arcuate edge and the other adjacent the outer arcuate edge. The flat panel elements also include at least one, and preferably two, spaced-apart openings at the other end, for the insertion of fastening means, to permit adjustment of the overlapping edges of the panel elements and to form an open inner circle of desired diameter.

Each of the flat-sheet elements comprises a fastening means which is secured to the other end of the flat-sheet element through the openings therein, and which fastening means is adapted to extend through the slotted openings of an adjacent panel or leaf element, so as to permit the adjustable assembly of the overlapping side edges of overlapping flat-sheet elements, to form a post-cover apparatus on the ground about a post to be protected. The enclosed inner circle is formed by the overlapping, inner arcuate edges of the flat-sheet elements, and the panel elements form an outer circle of defined protective diameter about the base of the post located at the drip line of the bush or tree. Typically, the fastening means comprises two-headed posts or two-headed studs integrally molded into a panel or leaf element, or as separate elements, the post extending through the slotted openings, and with enlarged heads on either side, to retain the overlapping panels or leaves together. The fastening means, for example, may comprise any head- or leg-post or pin arrangement, to retain the overlapping panels together and to secure the panels together, such as, but not limited to, nuts and bolts or paper brads with a head and expandable, bendable pair of legs and the like. The fastening means permits the slidable movement and adjustment of the flat-sheet elements, to accommodate an irregular trunk or post and to encompass and fit closely about the base generally of the post to be protected, and, thereafter, to be fastened, so as to hold the overlapping flat-sheet elements in a defined assembled position, typically by screwing on and tension-tightening, against the surface of the slotted openings, the outer heads on either side of the panels.

In one embodiment, the fastening means includes not only securing the overlapping panels together in a defined use position, but includes also means to secure or fasten the overlapping panels into the soil. Thus, for example, elongated, penetrating, barb-like elements may be used to insert through the slotted opening, to retain the panels in position, and the one barbed end of the fastening element inserted into the soil, to hold the panels in place, rather than tension-tightening of screw fasteners, to retain the panels in position.

The post-collar apparatus and method of the invention are inexpensive and easily assembled and used and reused, and, for example, may comprise molded, plastic, typically grass-green or straw-color, flat-sheet elements, with a pair of fastening posts or means, so as to permit the adjustment of the flat-sheet elements to encircle trees and shrubs, to eliminate the need for trimming grass or weeds and to avoid scarring or damaging of the stem of the tree, shrub or post from lawn mowers, weed cutters and the like, by eliminating growth of the grass or weeds by blocking sunlight from reaching the protected base of the post, tree or shrub.

In one embodiment, the post-collar apparatus may adjust, for example, from an open, inside, circular diameter of 1 to 5 inches, and with an outside diameter ranging from 13 to 17 inches, and, of course, larger inside and outside diameters are possible employing the design of the invention, as well as accommodating to irregularities of the tree or shrub base, so that one size of the adjustable post-collar apparatus fits a wide diameter of post, tree and shrub shapes to be protected. The adjustable, overlapping, flat-sheet elements are adjustable through the use of elongated slots in the flat-sheet elements, with slidable fastening means in the slotted openings, and retained to the post through the openings at the other end, such as pins or other means, extending through the slotted openings, to permit the adjustability of the flat-sheet elements, and which adjustable effect is similar to a camera shutter.

In order to provide sufficient adjustability of the overlapping flat-sheet elements or leaves, it is desirable, in one preferred embodiment, to provide for a pair of generally elongated; for example, 2 to 4 inches or more, slotted openings, and wherein one slotted opening is positioned toward the inner arcuate edge and is generally a straight opening slightly angled from the arcuate edge, and wherein the other elongated slotted opening toward the outer arcuate edge is a parabolic or cycloidal shape, or an involute of a circle, to permit adjustment of the panels.

The other end of each element then includes a pair of fastening means secured toward the other side edge of each element, and adapted, in an adjustable manner, to extend through both straight, arcuate, slotted openings of the adjacent, overlapping, flat-sheet elements, so as to permit the slidable adjustment, through the sliding of the fastening means in the slotted openings, to form the desired inner and outer diameters of the post-collar apparatus.

In one embodiment, a pair of fastening means extends through the slotted openings and is secured to the other end of the flat-sheet elements, should be capable of being fastened or tightened, so that the elements, once adjusted into a desired, encircling and protected configuration, may be retained easily in that position. The overlapping panels, once in position, can be retained or fastened together by fastening means, and which fastening means may retain the panels in position by forcing together the overlapping surfaces of the panels, or retaining the panels in position by extending the fastening means into the soil, to prevent lateral movement of the overlapping panels. The fastening means are removable, so that the post collar may be adjusted periodically or removed and reused.

Thus, the invention permits the operation of a post-collar apparatus composed primarily of a plurality of flat panels or leaves and adjustable fastening means which permits the adjusting and securing of the overlapping panels in a generally circular position, but accommodative to irregularities.

The invention will be described for the purposes of illustration only, in connection with certain embodiments; however, it is recognized that various changes, modifications, additions and improvements may be made to the illustrated embodiments by those persons skilled in the art, all falling within the spirit and scope of the invention.

DESCRIPTION OF THE EMBODIMENTS

Figure 1:
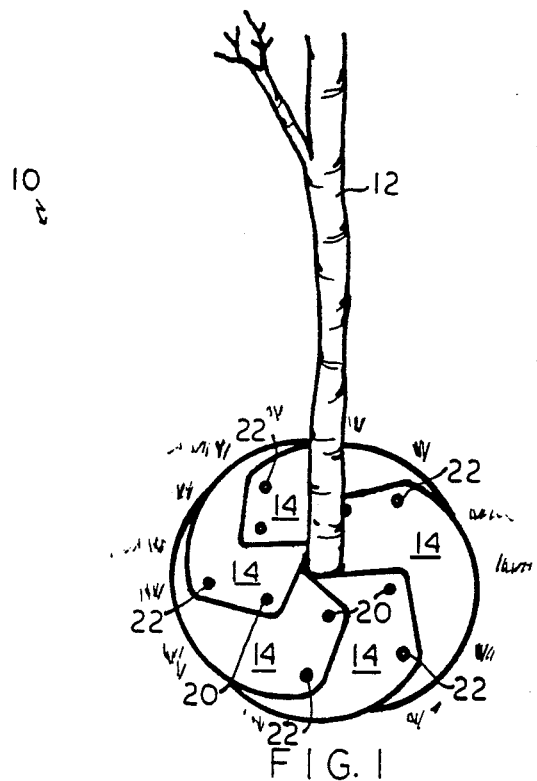
FIG. 1 is a perspective view from above of the post-collar apparatus of the invention in an encircled, protective position about the base of a tree.

FIG. 1 is a perspective view from the top of a system 10 showing a tree 12 surrounded by an adjustable, post-collar apparatus of the invention made up of a plurality of overlapping, trapezoidal, thin, flat, molded, plastic panels 14, with the one side edge of each panel overlapping on the side edge of the opposite panel and fastened into a position, so that the inner diameter of the plurality of five panels forms an open circle about the base of the tree 12, and an outer circle of sufficient diameter, to encompass an area to be protected from the growth of grass or weeds. The panels 14 have been secured together adjustably in the encircling, protecting position through the employment of threaded fastening studs 20 and 22 (see FIG. 4), to retain the panels in the protective position.

Figure 2:
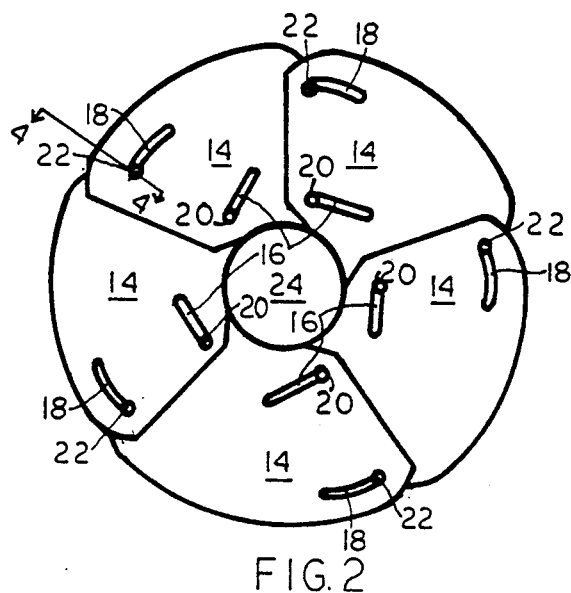
FIG. 2 is a bottom plan view of the post-collar apparatus of FIG. 1 without the tree.

FIG. 2 is a bottom plan view of the post-collar apparatus of the invention, showing generally trapezoidal, flat-sheet panels 14, with each panel having a curved, elongated, slotted opening 18 toward the outer periphery of the panel 14, and an inner, straight, elongated, slotted opening 16, and with threaded fasteners 20 and 22 shown in position, to form the generally open inner circle 24, the inner circle being adjustable by the panels to fit snugly and closely adjacent the base of a post, tree or shrub to be protected.

Figure 3:
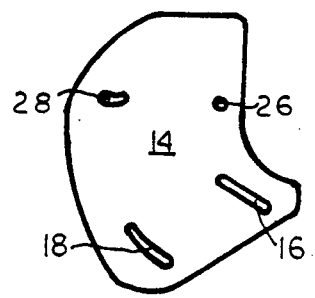
FIG. 3 is a top plan view of one of the panels of the post-collar apparatus of the invention.

FIG. 3 is a top plan view of one panel 14, without the threaded fasteners, and illustrating more particularly the circular hole 26 at the other end toward the inner portion of the inner arcuate edge of the panel 14, and a slightly elongated, slotted hole 28 toward the outer arcuate edge of the panel 14, which holes are designed for the insertion and retention of the threaded, post-headed fasteners, to hold the panels 14 in position. The slotted opening 28 retains the fastener 22, but permits limited, adjustable movement of the fastener 22 therein and relative to slotted opening 18, to provide greater tolerance in adjustment of the panels 14.

Figure 4:
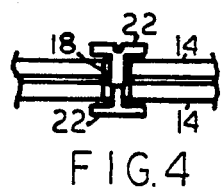
FIG. 4 is an enlarged, sectional view along the lines 4—4 of FIG. 2, illustrating the fastening together of the overlapping panels of the post-collar apparatus.

FIG. 4 is an enlarged, fragmented illustration along lines 4—4 of FIG. 2, showing a threaded, slotted, bolt fastener 22 which has been inserted in the elongated slot 18, with the threaded fastener 22 having a post which extends from the fixed head into the threaded lower section, the lower head adapted to be screwed onto the threaded bolt 22, and with the fastener 22 adapted to permit, in the untightened position, the slidable movement of the overlapping edges of the panels, to form the desired circle 24. The user may then employ a screwdriver to tighten the top slotted head of the fastener 22, to engage frictionally the two panels 14 together in a fixed, adjusted position.

In use, a plurality of the flat panel elements 14, all secured together by fasteners 20 and 22, extending through openings 26 and 28 and through the respective slotted openings 16 and 18, except for one panel element, is fan-spread out and placed about the base of a post, tree or shrub to be protected. The flat-sheet panels 14 are slidably moved and adjusted respective to each other, to form an inner circle 24 in which the assembled, inner, arcuate edges of the panels form an open circle which is snugly close or adjacent to the base of the post, tree or shrub, typically with the panels 14 adapted to be spaced generally uniformly, and then a pair of fasteners 20 and 22 is inserted through the slotted openings 16 and 18 of the last overlapping panel 14, to finish the enclosure, and all fasteners 20 and 22 then tightened, to engage frictionally the overlapping edges of the panels 14 together in the desired arrangement. The post-collar apparatus may be removed and reused, when no longer required, by releasing or snapping out the fasteners 20 and 22 in one panel, loosening the other fasteners, and reducing the other panels from a large fan shape to a restricted, narrow, fan arrangement for reuse or storage, or enlarging by adding panels.

Figure 5:
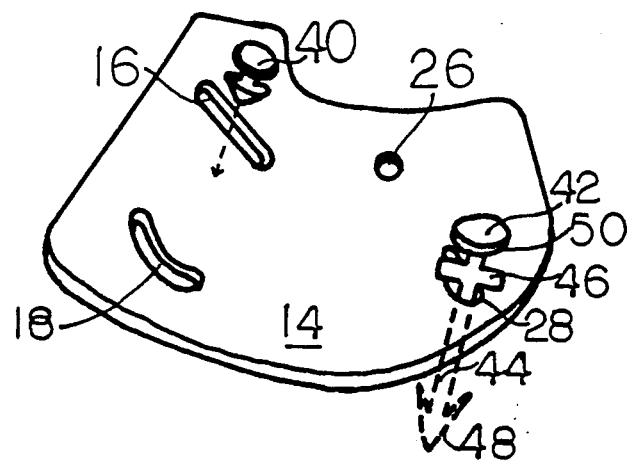
FIG. 5 is a perspective, partially exploded view of a panel of FIG. 3 with different soil fasteners.

With reference to FIG. 5, there is shown a single, flexible, opaque, green plastic panel 14, with a plastic, molded, two-headed button 40 adapted to be snap-fastened (path shown by dotted arrow lines) into a slotted opening 18 in panel 14. The button 40 also may be employed in the other openings of the panel. Also shown is a T-type barb fastener 50 composed of a hard, semirigid, molded plastic as a fastener, to secure the panels together, and also to be embedded in the soil. The barb fastener 50 includes a button head 42, a cylindrical shaft 44, and a barbed end 48 for implantation in the soil, and a cross member 46. If desired, the barb end of the fastener 50 may be replaced with a sharp-point end for insertion in the soil. The fastener 50 is shown extending partially through an outer slotted opening 28.

Figure 6:
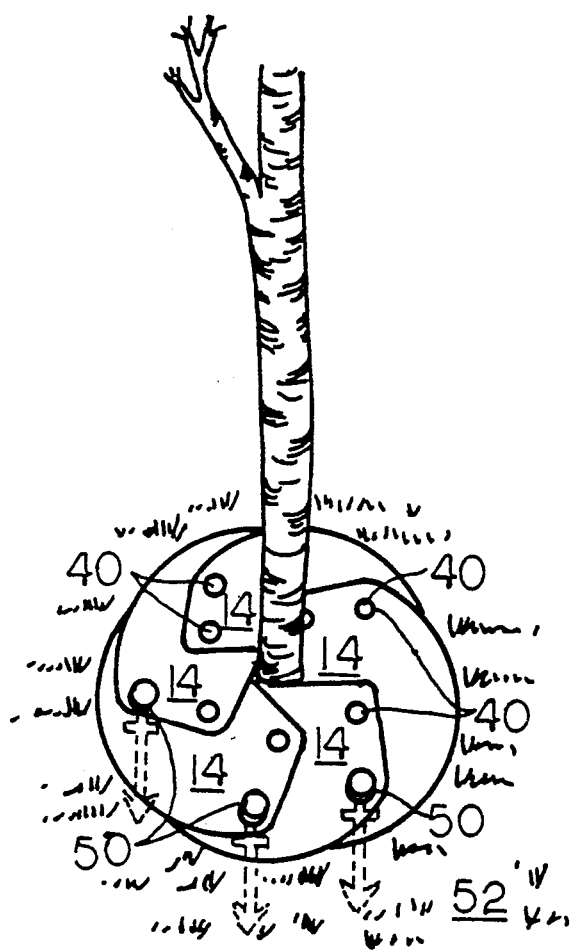
FIG. 6 is a perspective, partially sectional view of a post collar of FIG. 5.

With reference to FIG. 6, there is shown a post collar of the invention comprising side-edge, overlapping panels 14 in a secured, adjusted position about a tree 12. The panels are shown secured together with snap-in, molded buttons 40, and with the outer openings having the barb fastener 50 secured therethrough and then twisted 90 degrees, to place the cross bar across the outer openings, which are an involute of a circle, of the overlapping panels 14, to secure the panels together. The fasteners 50 are illustrated in dotted lines. Also the barb 48 of the barb fastener is shown embedded in the soil 52, to secure the overlapping secured panels 14 as a post cover in position to the soil 52. The buttons 40 and the barb fasteners may be used in any combination as desired and in one or more openings as desired, but typically the barb fasteners 50 should be used in at least two openings, to secure the post cover to the soil. The barb fasteners 50, on twisting, can be removed for reuse and for readjustment or reuse of the panels 14.

The adjustable, post-collar apparatus as described and illustrated in the drawings thereby provides for a simple, effective, inexpensive, adjustable means and method to encircle a post, tree or shrub and to eliminate the need to trim grass or weeds along the protected and encircled area.

What is claimed is:

1. An adjustable post-collar apparatus to encircle a post or botanical item at its base to eliminate the growth of grass or weeds about the post or botanical item, which post-collar apparatus comprises:
    a) a plurality of at least three, separate and generally trapezoidal, flat-panel sheet elements;
    b) each flat-sheet element having a generally arcuate inner edge, a generally arcuate outer edge and first and second side edges;
    c) each flat-sheet element characterized by at least one slotted opening toward and adjacent the first side edge, and at least one opening toward and adjacent the second side edge;
    d) the flat-sheet elements arranged in a side-edge, overlapping relationship, with the openings of one flat-sheet element generally aligned with the openings of an overlapping flat-sheet element, to form a post cover having an open inner circle of the overlapping, inner arcuate edges about the base of the post, and an outer circle of defined diameter; and
    e) fastening means extending between the aligned openings of the overlapping flat-sheet elements, to permit the slidable adjustment of the flat-sheet elements as a defined post-collar apparatus, and to fasten the flat-sheet elements in a defined post-collar position.

2. The apparatus of claim 1 which includes from three to seven flat-sheet elements.

3. The apparatus of claim 1 wherein the slotted opening of each flat-sheet element is an elongated cycloidal opening toward the outer arcuate edge.

4. The apparatus of claim 1 wherein the flat-sheet element includes a first, slotted, outer, elongated opening as an involute of a circle toward the outer arcuate edge, a second, elongated, straight, slotted, inner opening toward the inner arcuate edge, and first and second openings, the first and second openings designed to be aligned, respectively, over the first and second slotted openings of the underlying flat-sheet elements in the post-cover apparatus.

5. The apparatus of claim 1 wherein the fastener means comprises a threaded, two-headed, post means to retain the overlapping flat-sheet elements together in a defined position.

6. The apparatus of claim 1 wherein the fastener means comprises a molded, two-headed, button element 7. The apparatus of claim 1 wherein the fastener means comprises a barb element having a head at one end and a point at the other end for insertion in the soil about the base of the post, to retain the post-collar apparatus in position.

8. The apparatus of claim 7 which includes also as a fastening means a plurality of two-headed elements.

9. The apparatus of claim 1 wherein the flat-sheet elements comprise opaque, plastic sheet elements.

10. The apparatus of claim wherein the fastening means includes an elongated shaft having a retainer head at the one end and means to insert in the soil about the base of the post at the other end, and a cross-bar element between the one and the other ends, the fastener means adapted to be inserted in diagonal openings, rotated to place the cross bar across the openings, and the other end in the soil about the base of the post.

11. In combination a post extending generally upright from the ground, and the post-collar apparatus of claim 1 on the ground about the base of the post.

12. The apparatus of claim 11 wherein the open inner circle is applied about a botanical item having a base and a drip line and the inner circle is closely adjacent the base while the outer circle has a diameter approximately at the drip line.

* * * * *

UNITED STATES PATENT AND TRADEMARK OFFICE
CERTIFICATE OF CORRECTION

PATENT NO.   : 5,279,069

DATED        : January 18, 1994

INVENTOR(S)  : C. Randolph Myer

It is certified that error appears in the above-identified patent and that said Letters Patent is hereby corrected as shown below:

Column 6:

Claim 5, line 26, after "elements"
                             insert --compressionally--.

Claim 10, line 39, after "claim" insert --1--.

Signed and Sealed this

Twenty-first Day of June, 1994

Attest:

BRUCE LEHMAN

*Attesting Officer*      *Commissioner of Patents and Trademarks*